United States Patent [19]

Hsiao

[11] Patent Number: 5,765,857

[45] Date of Patent: Jun. 16, 1998

[54] COLLAPSIBLE GOLF TROLLEY

[76] Inventor: Fang-Jung Hsiao, 58, Ma Yuan West St., Taichung, Taiwan

[21] Appl. No.: 653,422

[22] Filed: May 24, 1996

[51] Int. Cl.$^6$ ...................................................... B62B 1/00
[52] U.S. Cl. ...................... 280/646; 280/655; 280/DIG. 6
[58] Field of Search ................................. 280/646, 652, 280/655, 42, DIG. 6

[56] References Cited

U.S. PATENT DOCUMENTS 5,106,117  4/1992  Wang ........................................ 280/646
5,180,184  1/1993  Chiu ......................................... 280/646

Primary Examiner—Robert J. Oberleitner
Assistant Examiner—Pamela J. Lipka

[57] ABSTRACT

A collapsible golf trolley comprises a handle, a first rod, a second rod and a third rod. The handle and the first rod are connected by a coupling. The first rod and the second rod are connected by a first upper coupler and a first lower coupler. The second rod and the third rod are connected by a second upper coupler and a second lower coupler. A first round joint is disposed on the coupling. A second round joint is disposed between the first upper coupler and the first lower coupler. A third round joint is disposed between the second upper coupler and the second lower coupler. A first bracket is disposed on the second rod. A second bracket is disposed on the third rod. First and second wheel support frames are connected to the joint block. The first wheel support frame connects and supports a first wheel. The second wheel support frame connects and supports a second wheel.

1 Claim, 6 Drawing Sheets

COLLAPSIBLE GOLF TROLLEY

BACKGROUND OF THE INVENTION

The invention relates to a golf trolley. More particularly, the invention relates to a collapsible frame device of a golf trolley.

Referring to FIG. 7, a conventional collapsible golf trolley 3 has an upper frame 32 and a lower frame 33. An upper bracket 34 is disposed on the upper frame 32. A lower bracket 35 is disposed on the lower frame 33. A seat 36 is disposed at the lower end of the lower bracket 35. A handle bar 31 and the upper frame 32 are connected by a coupling 39 and fastened by a fastener 391. The upper bracket 34 and the lower bracket 35 are connected by an upper coupler 301 and a lower coupler 305. A protrusion 302 is disposed on the upper coupler 301. A press plate 304 and a retaining ring 303 are disposed on the lower coupler 305. The press plate 304 and the retaining ring 303 are connected pivotally. The press plate 304 is pressed down. A joint block 40 is fastened on the lower frame 33. Two wheel support frames 38 are connected to the joint block 40. Each wheel support frame 38 supports a wheel 37. The protrusion 302, the press plate 304 and the retaining ring 303 may be loose-jointed after a long period of usage.

SUMMARY OF THE INVENTION

An object of the present invention is to provide a collapsible golf trolley which is easily folded.

Another object of the present invention is to provide a plurality of round joints which will not be loose-jointed after a long period of usage.

Another object of the present invention is to provide a handle which can be rotated within predetermined angles.

Accordingly, a collapsible golf trolley comprises a handle, a first rod, a second rod, and a third rod. The handle and the first rod are connected by a coupling. The first rod and the second rod are connected by a first coupler which has a first upper coupler and a first lower coupler coupling with the first upper coupler. The second rod and the third rod are connected by a second coupler which has a second upper coupler and a second lower coupler coupling with the second upper coupler. A first round joint is disposed on the coupling. A second round joint is disposed between the first upper coupler and the first lower coupler. A third round joint is disposed between the second upper coupler and the second lower coupler. A first bracket is disposed on the second rod. A second bracket is disposed on the third rod. A bag receiving seat is disposed at a lower end of the third rod. A hinged joint block is fastened on the third rod. First and second wheel support frames are connected to the hinged joint block. The first wheel support frame connects and supports a first wheel. The second wheel support frame connects and supports a second wheel.

The first round joint comprises a hollow inner disk, a hollow outer disk coupling with the hollow inner disk, and a round cover covering the hollow inner disk. The round cover has a rib disposed on an outer face of the round cover, at least a rim flange disposed on a rim of the round cover, and a threaded rod extending inward from a center of the round cover. The hollow inner disk has a peripheral outer wall, a hollow cylinder surrounded by a plurality of annular teeth toward the hollow outer disk, an annular groove defined between the peripheral outer wall and the hollow cylinder, a plurality of protrusions disposed on a face of the hollow cylinder toward the hollow outer disk, a center hole formed in a center of the hollow cylinder, a first and second annular walls abutting an inner periphery of the peripheral outer wall toward the round cover, at least a tapered bevel edge formed on a top of the first annular wall, and an inner plate extending from the second annular wall toward the round cover. The first annular wall is higher than the second annular wall. The hollow inner disk connects an upper end of the lower coupler. The hollow outer disk has a cylindrical disk disposed in the hollow outer disk, a plurality of blind holes disposed on a face of the hollow cylindrical disk toward the hollow inner disk, a through hole formed in a center of the cylindrical disk, a plurality of annular serrations disposed in the hollow outer disk toward the hollow inner disk, and an annular recess formed on an opening of the cylindrical disk. The hollow outer disk connects the handle. A spring is inserted in the center hole of the hollow cylinder and the through hole of the cylindrical disk. The hollow outer disk couples with the hollow inner disk. One end of the spring is inserted in the annular recess. The threaded rod passes through the center hole of the hollow cylinder, the spring and the through hole of the cylindrical disk to be screwed by a nut tightly. The rim flange is pressed against the first annular wall. The annular serrations engage with the corresponding annular teeth. The protrusions are inserted in the corresponding blind holes.

Each of the second and third round joints comprises a hollow inner disk, a hollow outer disk coupling with the hollow inner disk, and a round cover covering the hollow inner disk. The round cover has a rib disposed on an outer face of the round cover, at least a rim flange disposed on a rim of the round cover, and a threaded rod extending inward from a center of the round cover. The hollow inner disk has a peripheral outer wall, a hollow cylinder surrounded by a plurality of annular teeth toward the hollow outer disk, an annular groove defined between the peripheral outer wall and the hollow cylinder, a plurality of protrusions disposed on a face of the hollow cylinder toward the hollow outer disk, a center hole formed in a center of the hollow cylinder, first and second annular walls abutting an inner periphery of the peripheral outer wall toward the round cover, at least a tapered bevel edge formed on a top of the first annular wall, and an inner plate extending from the second annular wall toward the round cover. The first annular wall is higher than the second annular wall. The hollow inner disk connects an upper end of the lower coupler. The hollow outer disk has a cylindrical disk disposed in the hollow outer disk, a plurality of blind holes disposed on a face of the hollow cylindrical disk toward the hollow inner disk, a through hole formed in a center of the cylindrical disk, a plurality of annular serrations disposed in the hollow outer disk toward the hollow inner disk, and an annular recess formed on an opening of the cylindrical disk. The hollow outer disk connects a lower end of the upper coupler. A spring is inserted in the center hole of the hollow cylinder and the through hole of the cylindrical disk. The hollow outer disk couples with the hollow inner disk. One end of the spring is inserted in the annular recess. The threaded rod passes through the center hole of the hollow cylinder, the spring and the through hole of the cylindrical disk to be screwed by a nut tightly. The rim flange is pressed against the first annular wall. The annular serrations engage with the corresponding annular teeth. The protrusions are inserted in the corresponding blind holes.

Each round cover is rotated ninety degrees. Each rim flange is turned along each corresponding tapered bevel edge to each corresponding second annular wall. Each spring extends so that each of the corresponding annular serrations disengage from each of the corresponding annular teeth. Each of the protrusions disengage from each of the corresponding blind holes. The first and second wheels are folded adjacent to the third rod. The second upper coupler is folded downward toward the second lower coupler. The first rod and the second rod are turned upside down. The first upper coupler is folded upward toward the first lower coupler. The collapsible golf trolley is folded into a compact configuration.

DETAILED DESCRIPTION OF THE INVENTION

Figure 1:
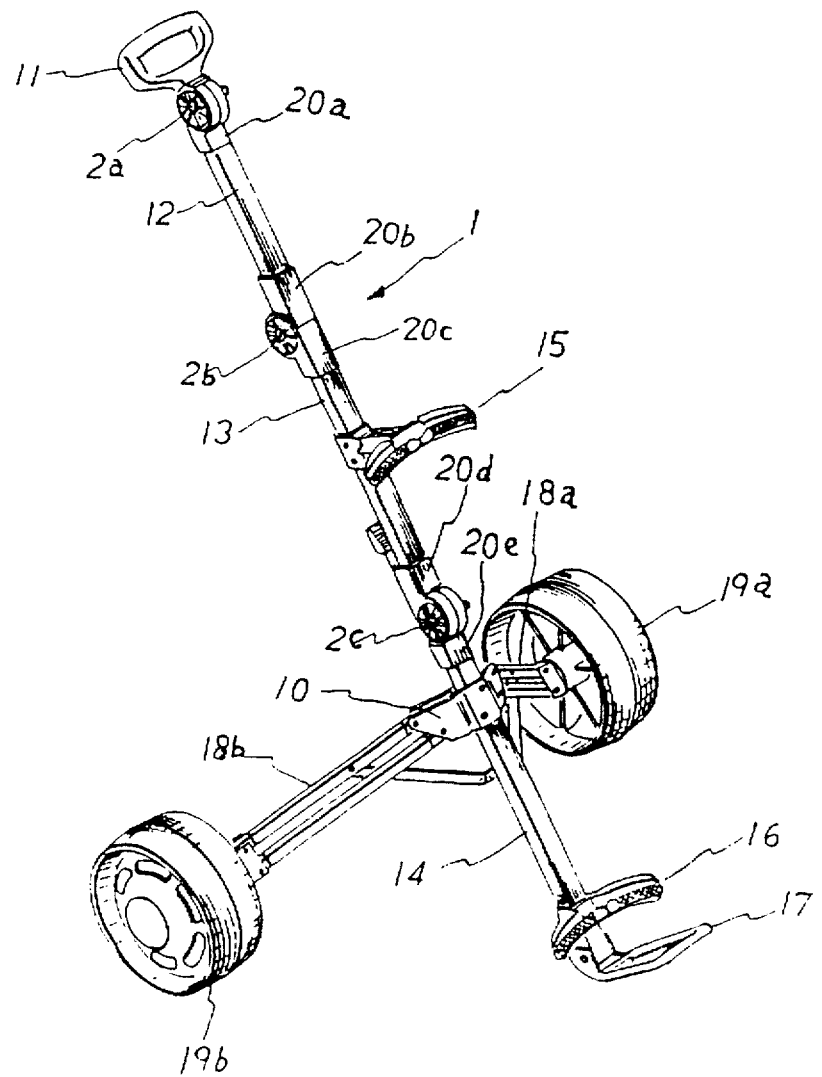
FIG. 1 is a perspective assembly view of a collapsible golf trolley of a preferred embodiment in accordance with the invention.
Figure 2:
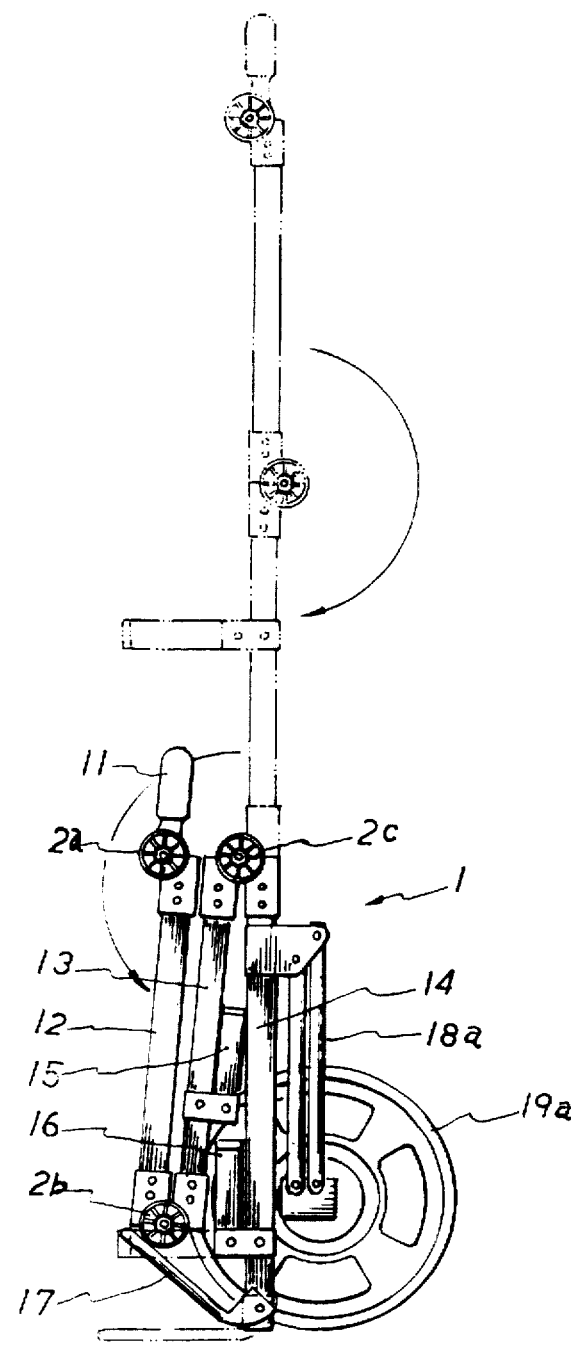
FIG. 2 is a schematic view illustrating the folding of a collapsible golf trolley.

Referring to FIGS. 1 and 2, a collapsible golf trolley 1 comprises a handle 11, a first rod 12, a second rod 13, and a third rod 14. The handle 11 and the first rod 12 are connected by a coupling 20a. The first rod 12 and the second rod 13 are connected by a first coupler which has a first upper coupler 20b and a first lower coupler 20c coupling with the first upper coupler 20b. The second rod 13 and the third rod 14 are connected by a second coupler which has a second upper coupler 20d and a second lower coupler 20e coupling with the second upper coupler 20d. A first round joint 2a is disposed on the coupling 20a. A second round joint 2b is disposed between the first upper coupler 20b and the first lower coupler 20c. A third round joint 2c is disposed between the second upper coupler 20d and the second lower coupler 20e. A first bracket 15 is disposed on the second rod 13. A second bracket 16 is disposed on the third rod 14. A bag receiving seat 17 is disposed at a lower end of the third rod 14. A hinged joint block 10 is fastened on the third rod 14. First and second wheel support frames 18a and 18b are connected to the hinged joint block 10. The first wheel support frame 18a connects and supports a first wheel 19a. The second wheel support frame 18b connects and supports a second wheel 19b. The first and second wheels 19a and 19b are folded adjacent to the third rod 14 (the hinged joint block 10 and the first and second wheels 19a and 19b of the invention are the same as those of the prior art to be folded together in the same way). The second upper coupler 20d is folded downward toward the second lower coupler 20e. Thus the first rod 12 and the second rod 13 are turned upside down. The first upper coupler 20b is folded upward toward the first lower coupler 20c. Thus the collapsible golf trolley 1 is folded into a compact configuration.

Figure 3:
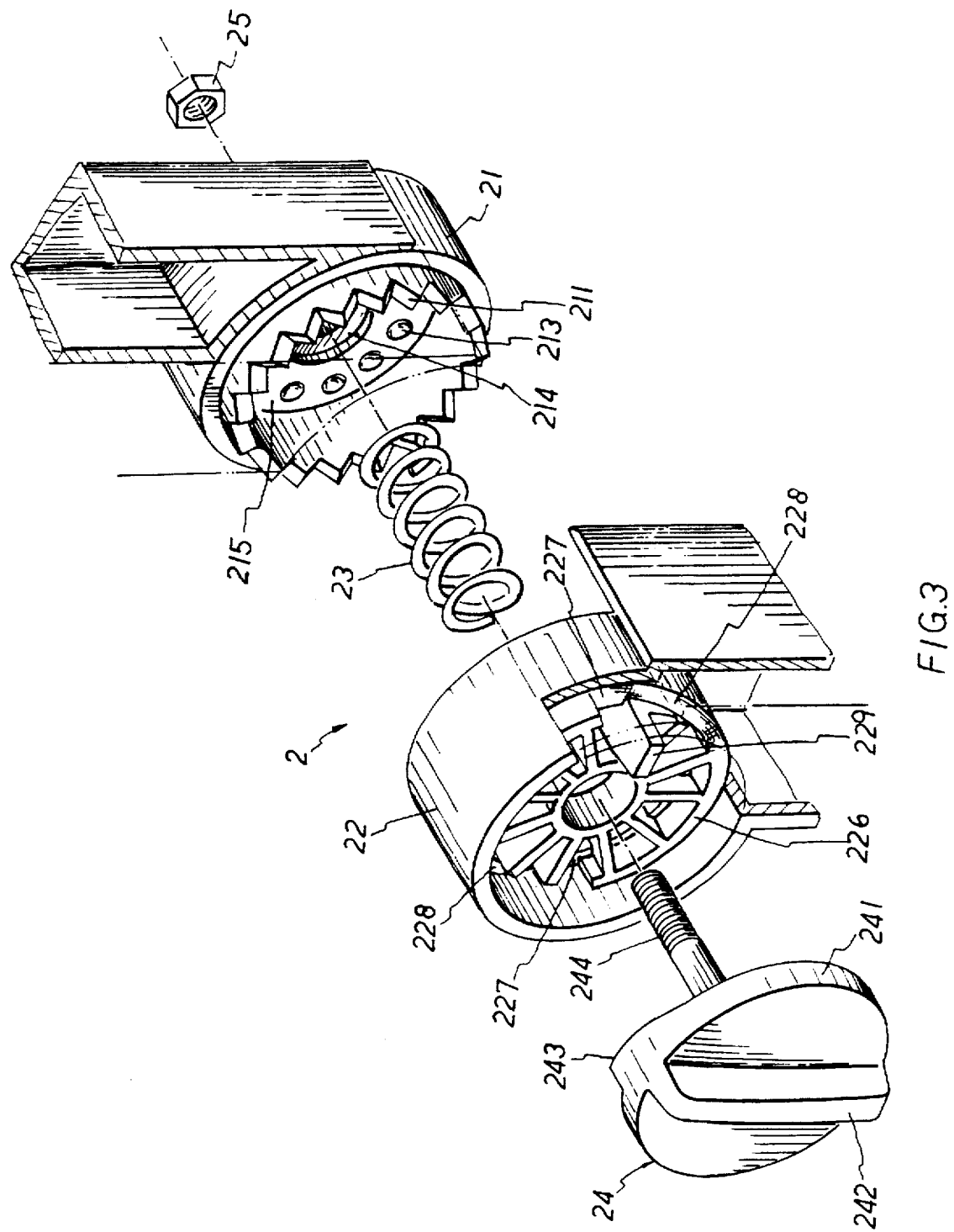
FIGS. 3 and 4 are perspective exploded views of a round joint.
Figure 4:
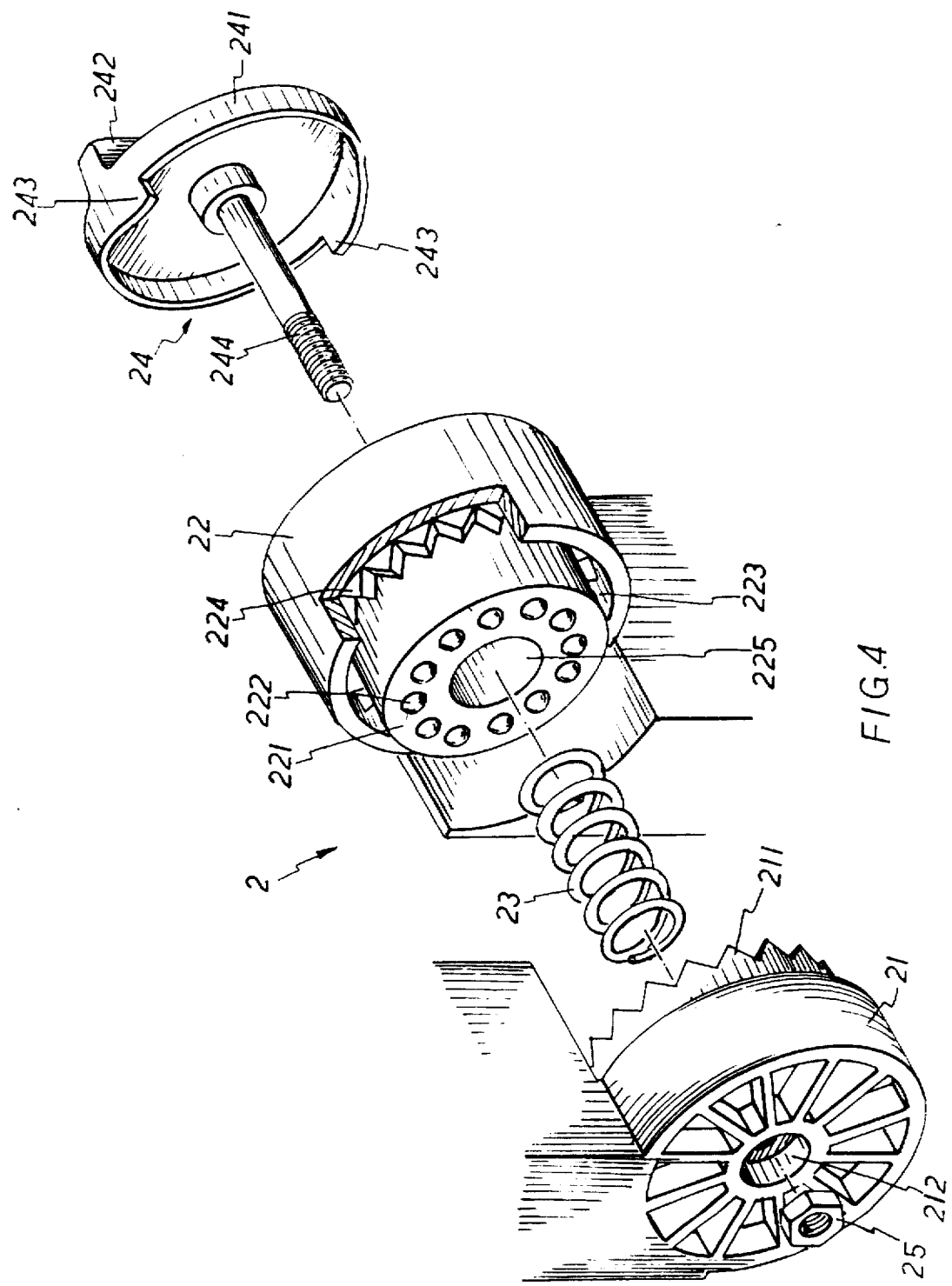
Figure 6:
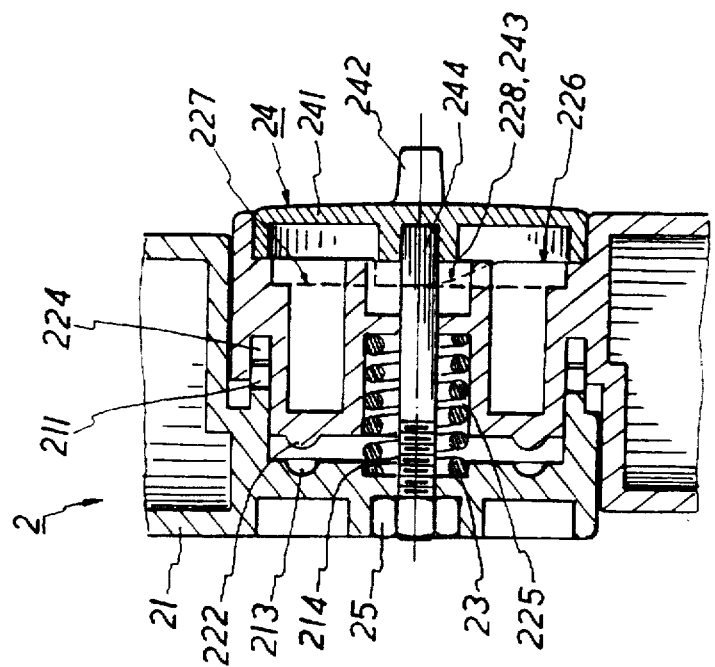
FIGS. 5 and 6 are schematic views illustrating the operation of a round joint.
Figure 5:
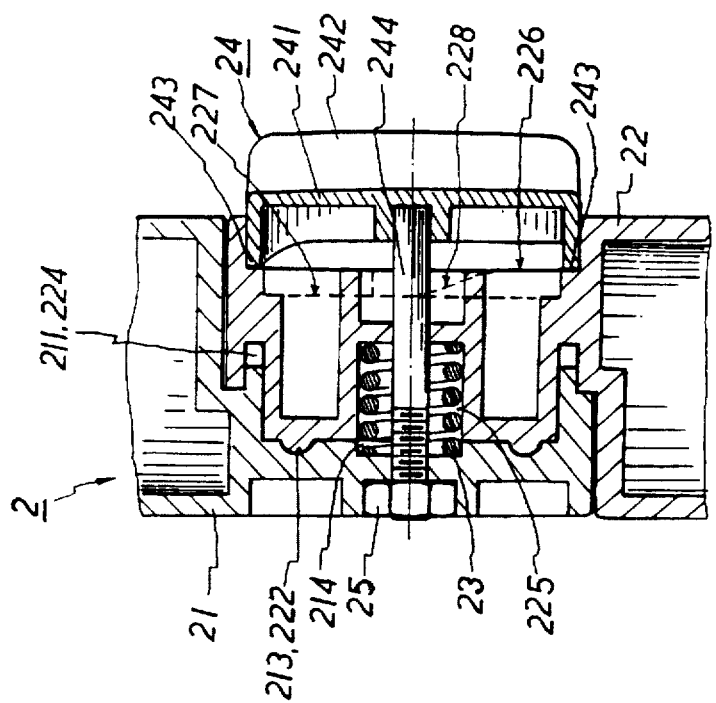
Figure 7:
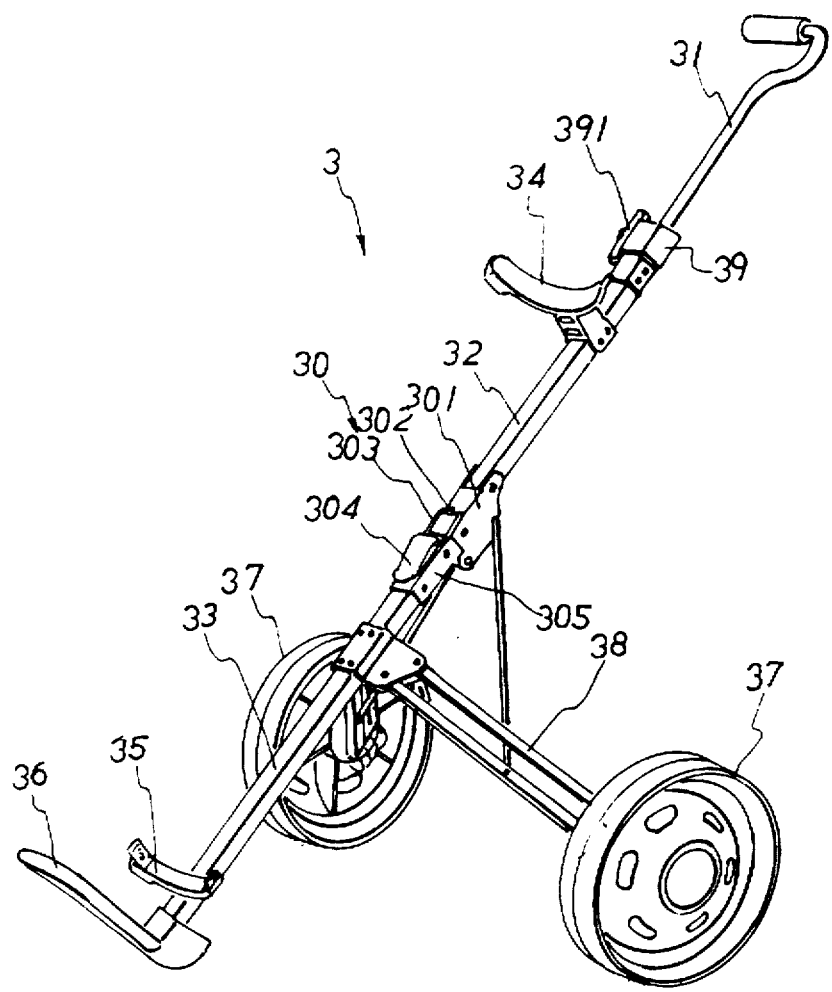
FIG. 7 is a perspective assembly view of a conventional collapsible golf trolley of the prior art.

Referring to FIGS. 3 and 4, a round joint 2 (the structures of the first, second and third round joints 2a, 2b and 2c are the same as the structure of the round joint 2) comprises a hollow inner disk 22, a hollow outer disk 21 coupling with the hollow inner disk 22, and a round cover 24 covering the hollow inner disk 22. The round cover 24 has a rib 242 disposed on an outer face of the round cover 24, at least a rim flange 243 disposed on a rim 241 of the round cover 24, and a threaded rod 244 extending inward from a center of the round cover 24. The hollow inner disk 22 has a peripheral outer wall, a hollow cylinder 221 surrounded by a plurality of annular teeth 224 toward the hollow outer disk 21, an annular groove 223 defined between the peripheral outer wall and the hollow cylinder 221, a plurality of protrusions 222 disposed on a face of the hollow cylinder 221 toward the hollow outer disk 21, a center hole 225 formed in a center of the hollow cylinder 221, first and second annular walls 226 and 227 abutting an inner periphery of the peripheral outer wall toward the round cover 24, at least a tapered bevel edge 228 formed on a top of the first annular wall 226, and an inner plate 229 extending from the second annular wall 227 toward the round cover 24. The first annular wall 226 is higher than the second annular wall 227. The hollow inner disk 22 connects an upper end of the lower coupler (the structures of the first and second lower couplers 20c and 20e and the coupling 20a are the same as the structure of the lower coupler which connects the hollow inner disk 22). The hollow outer disk 21 has a cylindrical disk 215 disposed in the hollow outer disk 21, a plurality of blind holes 213 disposed on a face of the hollow cylindrical disk 215 toward the hollow inner disk 22, a through hole 212 formed in a center of the cylindrical disk 215, a plurality of annular serrations 211 disposed in the hollow outer disk 21 toward the hollow inner disk 22, and an annular recess 214 formed on an opening of the cylindrical disk 215. The hollow outer disk 21 connects a lower end of the upper coupler (the structures of the first and second upper couplers 20b and 20d are the same as the structure of the upper coupler which connects the hollow outer disk 21). However, the hollow outer disk of the first round joint 2a connects the handle 11.

Referring to FIGS. 3 to 6, a spring 23 is inserted in the center hole 225 of the hollow cylinder 221 and the through hole 212 of the cylindrical disk 215. The hollow outer disk 21 couples with the hollow inner disk 22. One end of the spring 23 is inserted in the annular recess 214. The threaded rod 244 passes through the center hole 225 of the hollow cylinder 221, the spring 23 and the through hole 212 of the cylindrical disk 215 to be screwed by a nut 25 tightly. The rim flange 243 is pressed against the first annular wall 226. The annular serrations 211 engage with the corresponding annular teeth 224. The protrusions 222 are inserted in the corresponding blind holes 213. The round cover 24 is rotated ninety degrees. The rim flange 243 is turned along the tapered bevel edge 228 to the second annular wall 227. The spring 23 extends so that the annular serrations 211 disengage from the corresponding annular teeth 224. The protrusions 222 disengage from the corresponding blind holes 213.

The invention is not limited to the above embodiment but various modification thereof may be made. Further, various changes in form and detail may be made without departing from the scope of the invention.

I claim:

1. A collapsible golf trolley comprising:

a handle, a first rod, a second rod, and a third rod;

said handle and said first rod connected by a coupling;

said first rod and said second rod connected by a first coupler which has a first upper coupler and a first lower coupler coupling with said first upper coupler;

said second rod and said third rod connected by a second coupler which has a second upper coupler and a second lower coupler coupling with said second upper coupler;

a first round joint disposed on said coupling;

a second round joint disposed between said first upper coupler and said first lower coupler;

a third round joint disposed between said second upper coupler and said second lower coupler;

a first bracket disposed on said second rod;

a second bracket disposed on said third rod;

a bag receiving seat disposed at a lower end of said third rod;

a hinged joint block fastened on said third rod, first and second wheel support frames connected to said hinged joint block, said first wheel support frame connecting and supporting a first wheel, said second wheel support frame connecting and supporting a second wheel;

said first round joint comprising a hollow inner disk, a hollow outer disk coupling with said hollow inner disk, and a round cover covering said hollow inner disk, said round cover having a rib disposed on an outer face of said round cover, at least a rim flange disposed on a rim of said round cover, and a threaded rod extending inward from a center of said round cover, said hollow inner disk having a peripheral outer wall, a hollow cylinder surrounded by a plurality of annular teeth toward said hollow outer disk, an annular groove defined between said peripheral outer wall and said hollow cylinder, a plurality of protrusions disposed on a face of said hollow cylinder toward said hollow outer disk, a center hole formed in a center of said hollow cylinder, first and second annular walls abutting an inner periphery of said peripheral outer wall toward said round cover, at least a tapered bevel edge formed on a top of said first annular wall, and an inner plate extending from said second annular wall toward round cover, said first annular wall higher than said second annular wall, said hollow inner disk connecting an upper end of said first lower coupler, said hollow outer disk having a cylindrical disk disposed in said hollow outer disk, a plurality of blind holes disposed on a face of said hollow cylindrical disk toward said hollow inner disk, a through hole formed in a center of said cylindrical disk, a plurality of annular serrations disposed in said hollow outer disk toward said hollow inner disk, and an annular recess formed on an opening of said cylindrical disk, said hollow outer disk connecting said handle, a spring inserted in said center hole of said hollow cylinder and said through hole of said cylindrical disk, said hollow outer disk coupling with said hollow inner disk, one end of said spring inserted in said annular recess, said threaded rod passing through said center hole of said hollow cylinder, said spring and said through hole of said cylindrical disk to be screwed by a nut tightly, said rim flange pressed against said first annular wall, said annular serrations engaging with said corresponding annular teeth, said protrusions inserted in said corresponding blind holes;

each of said second and third round joints comprising a hollow inner disk, a hollow outer disk coupling with said hollow inner disk, and a round cover covering said hollow inner disk, said round cover having a rib disposed on an outer face of said round cover, at least a rim flange disposed on a rim of said round cover, and a threaded rod extending inward from a center of said round cover, said hollow inner disk having a peripheral outer wall, a hollow cylinder surrounded by a plurality of annular teeth toward said hollow outer disk, an annular groove defined between said peripheral outer wall and said hollow cylinder, a plurality of protrusions disposed on a face of said hollow cylinder toward said hollow outer disk, a center hole formed in a center of said hollow cylinder, first and second annular walls abutting an inner periphery of said peripheral outer wall toward said round cover, at least a tapered bevel edge formed on a top of said first annular wall, and an inner plate extending from said second annular wall toward said round cover, said first annular wall higher than said second annular wall, said hollow inner disk connecting an upper end of said second lower coupler, said hollow outer disk having a cylindrical disk disposed in said hollow outer disk, a plurality of blind holes disposed on a face of said hollow cylindrical disk toward said hollow inner disk, a through hole formed in a center of said cylindrical disk, a plurality of annular serrations disposed in said hollow outer disk toward said hollow inner disk, and an annular recess formed on an opening of said cylindrical disk, said hollow outer disk connecting a lower end of said second upper coupler, a spring inserted in said center hole of said hollow cylinder and said through hole of said cylindrical disk, said hollow outer disk coupling with said hollow inner disk, one end of said spring inserted in said annular recess, said threaded rod passing through said center hole of said hollow cylinder, said spring and said through hole of said cylindrical disk to be screwed by a nut tightly, said rim flange pressed against said first annular wall, said annular serrations engaging with said corresponding annular teeth, said protrusions inserted in said corresponding blind holes;

Wherein said first and second wheels are folded adjacent to said third rod, each said round cover is rotated ninety degrees so that each said rim flange is turned along each said corresponding tapered bevel edge to each said corresponding second annular wall, then each said spring extends so that each of said corresponding annular serrations disengages from each of said corresponding annular teeth, each of said protrusions disengages from each of said corresponding blind holes, said second upper coupler is folded downward toward said second lower coupler, said first rod and said second rod are turned upside down, said first upper coupler is folded upward toward said first lower coupler, and said collapsible golf trolley is folded into a compact configuration.

* * * * *